(12) United States Patent
Neilson et al.

(10) Patent No.: US 8,770,373 B2
(45) Date of Patent: Jul. 8, 2014

(54) CONVEYOR SYSTEM FOR CONTINUOUS SURFACE MINING

(75) Inventors: Brad Neilson, Mt. Keira (AU); Michael S. Adamczyk, Franklin, PA (US); Joseph J. Zimmerman, Franklin, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 111 days.

(21) Appl. No.: 13/088,214

(22) Filed: Apr. 15, 2011

(65) Prior Publication Data

US 2011/0253502 A1  Oct. 20, 2011

Related U.S. Application Data

(60) Provisional application No. 61/325,061, filed on Apr. 16, 2010, provisional application No. 61/325,064, filed on Apr. 16, 2010, provisional application No. 61/325,067, filed on Apr. 16, 2010, provisional application No. 61/325,070, filed on Apr. 16, 2010, provisional application No. 61/366,394, filed on Jul. 21, 2010.

(51) Int. Cl.
*E21C 41/26* (2006.01)
*B65G 41/00* (2006.01)

(52) U.S. Cl.
CPC ............. *B65G 41/003* (2013.01); *E21C 41/26* (2013.01)
USPC ........... 198/301; 198/303; 198/311; 198/586; 198/571; 198/540; 299/1.6; 299/1.7; 299/18; 299/43

(58) Field of Classification Search
USPC ............. 198/301, 303, 311; 299/1.6, 1.7, 18, 299/43–45
See application file for complete search history.

(56) References Cited

U.S. PATENT DOCUMENTS 2,722,409 A * 11/1955 Bergmann ..................... 299/56
3,301,599 A    1/1967 Heimaster (Continued)

FOREIGN PATENT DOCUMENTS

| DE | 10059841 | 6/2002 |
| DE | 102007007996 | 10/2008 |
| WO | 2009114106 | 9/2009 |

OTHER PUBLICATIONS

Trencor "3000SM Surface Miner" website pages printed from http://www.trencor.com/downloads/3000SM_spec_sheet_web334.pdf (Aug. 2003).

(Continued)

*Primary Examiner* — Mark A Deuble
(74) *Attorney, Agent, or Firm* — Michael Best & Friedrich LLP

(57) ABSTRACT

A side shifting conveyor is provided for a surface mining operation. The conveyor generally includes conveyor sections and conveyor translation devices. Each conveyor translation device includes a drive operable to move the associated at least one conveyor section in a direction substantially perpendicular to the conveying direction. The conveyor further includes a controller operatively coupled to each drive for controlling operation of the drive and coordinating movement of the conveyor sections. A method for moving a conveyor in a surface mine generally includes sensing that a surface miner operable to deposit material onto the conveyor sections has moved beyond one of the conveyor sections, fixing a position relative to the surface mine of a conveyor translation device associated with one of the conveyor sections, and operating the conveyor translation device to move one of the conveyor sections in a direction substantially perpendicular to the conveying direction.

24 Claims, 12 Drawing Sheets

(56) References Cited

U.S. PATENT DOCUMENTS

| | | | |
|---|---|---|---|
| 3,361,248 A * | 1/1968 | Daymon | 198/303 |
| 3,951,459 A | 4/1976 | Honeycutt, Jr. | |
| 3,958,830 A | 5/1976 | Johns | |
| 3,960,408 A | 6/1976 | Johns | |
| 3,980,340 A | 9/1976 | Johns | |
| 4,017,122 A | 4/1977 | Simpson | |
| 4,055,051 A | 10/1977 | Finney | |
| 4,096,753 A | 6/1978 | Mullins | |
| 4,118,072 A | 10/1978 | Kelley et al. | |
| 4,199,193 A | 4/1980 | Damron et al. | |
| 4,887,935 A * | 12/1989 | Koppers et al. | 405/302 |
| 4,906,133 A | 3/1990 | Martin | |
| 4,960,306 A | 10/1990 | Kipp et al. | |
| 5,092,659 A | 3/1992 | Grathoff | |
| 5,154,489 A | 10/1992 | Lemieux | |
| 5,275,469 A * | 1/1994 | Geuns et al. | 299/1.7 |
| 5,567,018 A | 10/1996 | Hart | |
| 5,730,501 A | 3/1998 | Grathoff et al. | |
| 6,086,159 A | 7/2000 | Peterson | |
| 6,191,733 B1 | 2/2001 | Dizchavez | |
| 6,267,191 B1 | 7/2001 | Hettinger | |
| 6,361,119 B1 * | 3/2002 | Kussel | 299/1.1 |
| 6,481,802 B1 * | 11/2002 | Kussel | 299/1.6 |
| 6,505,892 B1 | 1/2003 | Walker et al. | |
| 6,547,336 B2 | 4/2003 | Hoffmann | |
| 7,416,369 B2 * | 8/2008 | Kellermann et al. | 405/302 |
| 8,251,199 B2 * | 8/2012 | Tebbe et al. | 198/301 |
| 2004/0000809 A1 | 1/2004 | Harman et al. | |
| 2007/0039802 A1 * | 2/2007 | Kahrger et al. | 198/303 |
| 2009/0066147 A1 | 3/2009 | Tout et al. | |
| 2009/0066148 A1 | 3/2009 | Willison | |

OTHER PUBLICATIONS

Wirtgen "Technical Specification Surface Miner 4200 SM" website pages printed from http://www.wirtgen.de/media/redaktion/pdf-dokumente/05_surface_miner/4200sm/datenblatt_31/d4200sme.pdf (Apr. 2009).

Takraf "Tenova Takraf Surface Miners" website pages printed from http://www.takraf.com/files/brochures/tenova_takraf_surface_miner_en.pdf (Feb. 2010).

Wirtgen "Wirtgen Surface Mining Manual Applications and Planning Guide" website pages printed from http://www.wirtgen.de/media/redaktion/pdf-dokumente/05_surface_miner/_allgemein_2/sm_handbuch/m_mining_e.pdf (Mar. 2010).

Takraf "Application of Surface Miner today and future development" website pages printed from http://www.lateinamerikaverein.de/files/LAV/Veranstaltungen/Materialien_LAV_Veranstaltungen/TAKRAF_Heiko_Tuber.pdf (Apr. 2010).

PCT/US2011/032763 Written Opinion of the International Search Authority dated Jun. 22, 2011 (5 pages).

PCT/US2011/032763 International Search Report and Written Opinion dated Jun. 22, 2011 (3 pages).

PCT/US2011/032760 International Search Report dated Dec. 6, 2011, 3 pages.

PCT/US2011/032760 International Written Opinion dated Dec. 6, 2011, 5 pages.

First Office Action from the Australian Intellectual Property Office for Application No. 2011239427 dated Mar. 13, 2014 (3 pages).

* cited by examiner

CONVEYOR SYSTEM FOR CONTINUOUS SURFACE MINING

CROSS-REFERENCE TO RELATED APPLICATIONS

This application claims the benefit of and priority to U.S. Provisional Patent Application Nos. 61/325,061, 61/325,064, 61/325,067, and 61/325,070, all filed Apr. 16, 2010, and claims the benefit of and priority to U.S. Provisional Patent Application No. 61/366,394, filed Jul. 21, 2010. The entire contents of each of the foregoing applications are hereby incorporated by reference herein.

BACKGROUND

Most high production surface coal and iron ore mines utilize a cyclical process that includes drilling holes into the surface, inserting explosives into the holes, igniting the explosives to loosen the material, excavating the loosened material and loading it into haul trucks, transporting the material to a crushing and conveying facility, and depositing sized and sorted materials into appropriate stockpiles. This method has been in used for over 100 years and has been the subject of continuous refinement. The predominant method to excavate and load coal or iron ore is the use of high capacity hydraulic excavators (also referred to as hydraulic mining shovels). The predominant method to remove overburden is to use draglines and/or electric mining shovels. Recently, hydraulic mining shovels have increased in capacity and can now roughly equal the production rates of the smaller electric mining shovels.

Another fairly recent development is the adaptation of road milling machines for surface mining. These adapted road milling machines are typically man riding, diesel powered vehicles with belt driven cutting drums that operate in a fixed relationship to the ground.

SUMMARY

In one embodiment, the invention provides a side shifting conveyor for a surface mining operation. The conveyor generally includes a plurality of conveyor sections extending generally in a conveying direction and a plurality of conveyor translation devices. Each conveyor translation device is associated with at least one of the plurality of conveyor sections. Each conveyor translation device includes a drive operable to move the associated at least one conveyor section in a direction substantially perpendicular to the conveying direction. The conveyor further includes a controller operatively coupled to each drive for controlling operation of the drive and coordinating movement of the plurality of conveyor sections.

In another embodiment, the invention provides for a method for moving a conveyor in a surface mine. The conveyor includes a plurality of conveyor sections extending in a conveying direction. The method generally includes sensing that a surface miner operable to deposit material onto the conveyor sections has moved beyond one of the plurality of conveyor sections, fixing a position relative to the surface mine of a conveyor translation device associated with the one of the plurality of conveyor sections, and operating the conveyor translation device to move the one of the plurality of conveyor sections in a direction substantially perpendicular to the conveying direction.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
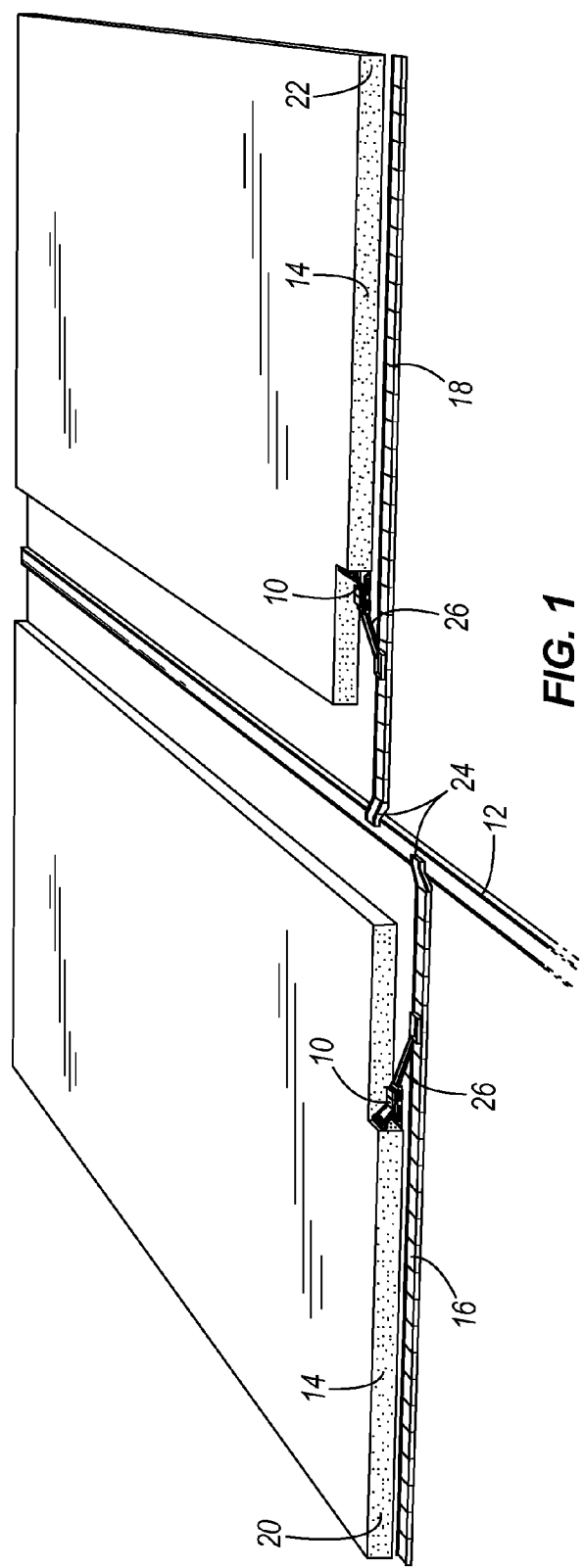
FIG. 1 is an aerial perspective view of a surface mining operation utilizing a pair of surface continuous miners.

FIG. 1 is an aerial perspective view of a first type of surface mining operation utilizing a pair of surface continuous miners 10. A discharge conveyor 12 extends along a mid-cut substantially normal to the two mining faces 14 on each side of the mid-cut. First and second side shifting face conveyors 16, 18 extend substantially perpendicularly outwardly from the discharge conveyor 12 along the mining face 14. When viewed from above, the first and second face conveyors 16 and 18 extend to the left and right of the discharge conveyor 12 in an alternate leaf pattern. The first face conveyor 16 extends to a first end 20 of the mining face 14, and the second face conveyor 18 extends to a second end 22 of the mining face 14. The face conveyors 16, 18 each include a discharge portion 24 located adjacent the discharge conveyor 12 between opposite first and second ends 20, 22, and can be operated to convey material removed from the mining face 14 toward the discharge conveyor 12. Although the illustrated operation includes two continuous miners 10 and first and second face conveyors 16, 18, other operations may include only one continuous miner 10 and only one face conveyor. Moreover, although the following discussion refers to the continuous miner 10 and first face conveyor 16, the discussion is equally applicable to the continuous miner 10 and second face conveyor 18.

Figure 2:
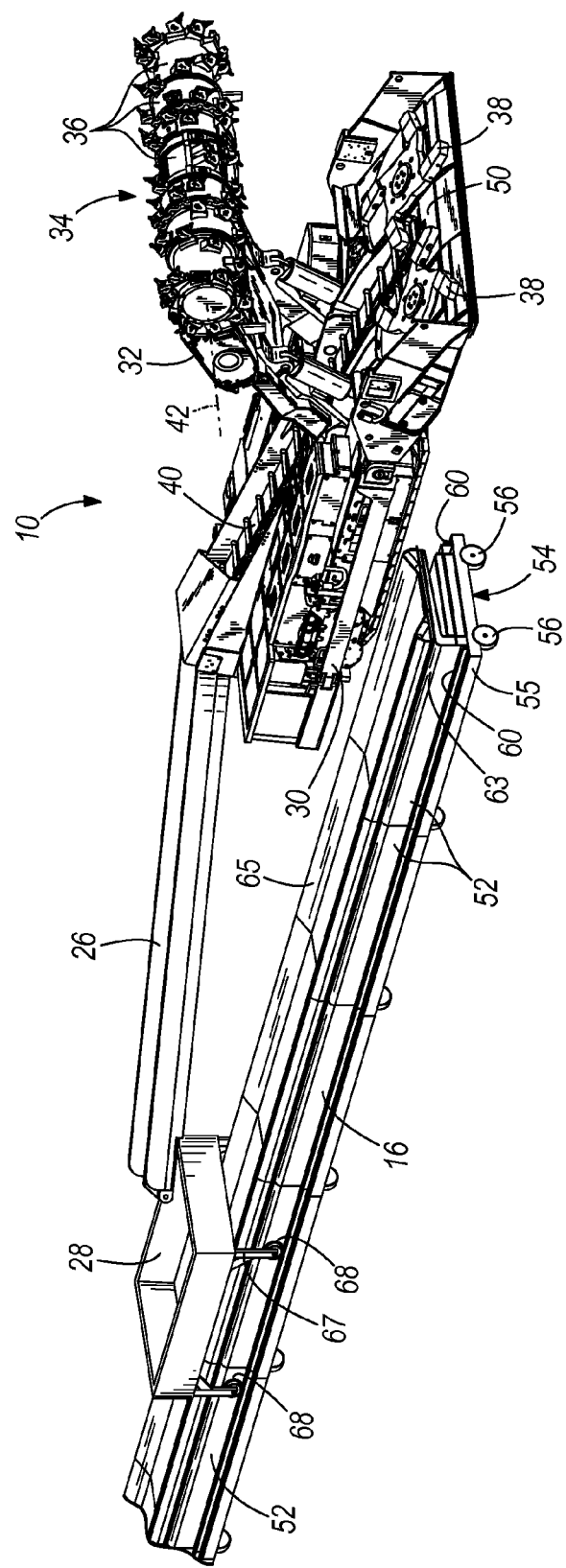
FIG. 2 is an enlarged perspective view similar to FIG. 1 showing one of the surface continuous miners.

Referring also to FIG. 2, the continuous miner 10 can remove material from the mining face 14 and deposit the removed material onto the face conveyor 16. The continuous miner 10 is connected by a bridge conveyor 26 to a hopper 28 that is mounted on the face conveyor 16. The continuous miner 10 moves laterally along the mining face 14 and removes material from the mining face 14. The continuous miner 10 also collects the removed material and conveys it to the hopper 28 via the bridge conveyor 26. In some embodiments, the hopper 28 includes crushing rollers (not shown) that size the material before discharging the crushed material onto the face conveyor 16, which extends below the hopper 28. The face conveyor 16 carries the material toward the discharge portion 24, which deposits the material onto the discharge conveyor 12. The discharge conveyor then carries the material away from the mining area for further processing. Material is thus continuously removed from the mining face 14 and conveyed from the continuous miner 10, to the hopper 28, to the face conveyor 16, to the discharge portion 24, and then away from the mining area via the discharge conveyor 12. In certain embodiments, the entire operation is automated and/or controlled via operators located away from the mining area.

Figure 3:
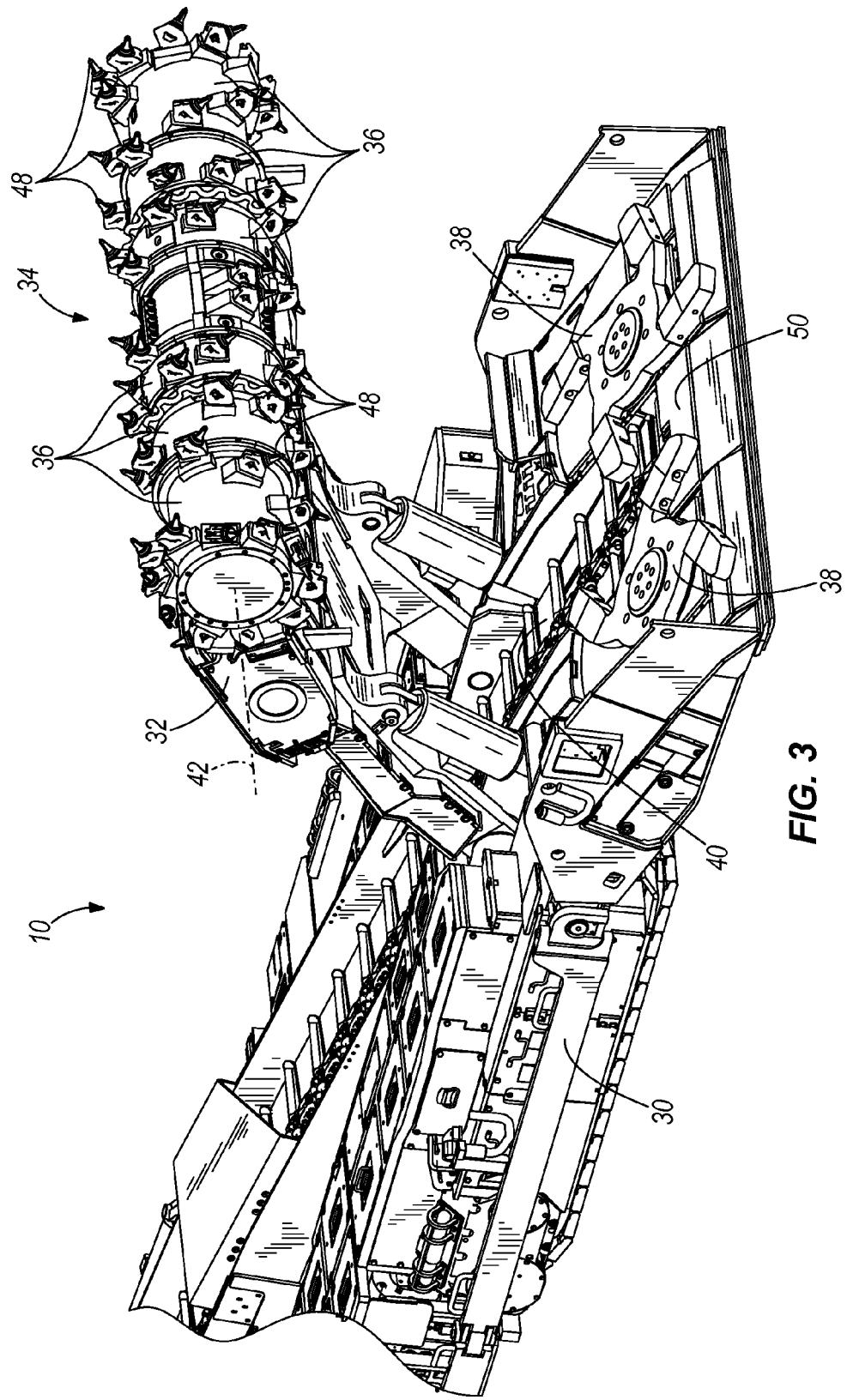
FIG. 3 is a perspective view of the continuous miner of FIG. 2.

FIG. 3 is a detailed view of the continuous miner 10. The continuous miner 10 includes a chassis 30, a vertically ranging cutting arm or boom 32 mounted on the chassis 30, and a laterally elongated mining head 34 mounted on the boom 32. The boom 32 is operable to move the mining head 34 in a generally vertical direction for removing material from the mining face 14. As illustrated, the range of vertical movement of the boom 32 is sufficient to position the mining head 34 higher than the other components of the continuous miner 10. In some embodiments the boom 32 can be raised to a vertical height above the ground of about 5 meters. The mining head 34 includes a plurality of large cutting drums 36 that are coaxially mounted on the end of the boom 32 for rotation about an axis 42. The cutting drums 36 are equipped with a plurality of teeth 48 that scrape, cut, and break material away from the mining face 14. The cutting drums 36 are operatively coupled to a cutter drive motor (not shown) that drives the rotatable cutting drums 36. The drive motor may be or include electric or hydraulic motors, a combination of electric and hydraulic motors, and in some embodiments may be driven or powered at least in part by an internal combustion engine carried on the chassis. In this regard, the continuous miner 10 may include a "drop-in" diesel-electric power pack or similar generator set that includes an internal combustion engine coupled to a generator or other suitable device for producing electrical power from the work performed by the engine. Such a generator set may be capable of driving and powering all operations of the continuous miner without the need for external power. Other constructions of the continuous miner 10 may utilize an external power source (not shown) and may include a trailing cable system for delivery of electrical power from the external power source. Still other constructions of the continuous miner 10 may include both a trailing cable system and a generator set such that either system may be used for providing electrical power, as dictated by a particular application or operating environment.

The continuous miner 10 also includes a tray 50 positioned generally below the mining head 34 for collecting material removed from the mining face 14. The tray 50 includes a pair of rotating collector wheels 38 that gather and direct material toward a miner conveyor 40 that extends away from the tray 50 toward the rear of the miner 10. The miner conveyor 40 extends rearwardly from the tray 50 and deposits the material removed from the mining face 14 onto the bridge conveyor 26 (see FIG. 2).

Referring again to FIG. 2, the bridge conveyor 26 extends between the tail end of the miner conveyor 40 and the hopper 28 that is positioned above the face conveyor 16. The bridge conveyor 26 has an articulating configuration that allows it to pivot with respect to one or both of the continuous miner 10 and the hopper 28. In some embodiments, the bridge conveyor 26 is also telescopically extendable. In some constructions the bridge conveyor 26 and/or the face conveyors 16, 18 can be plate-type conveyors that are based on an endless belt or chain flights. The bridge conveyor 26 can be operably driven by the drive system of the continuous miner 10 (e.g., the drop-in diesel electric power pack) or may include its own independent drive system, either of which may be electric and/or hydraulic in nature.

Figure 4:
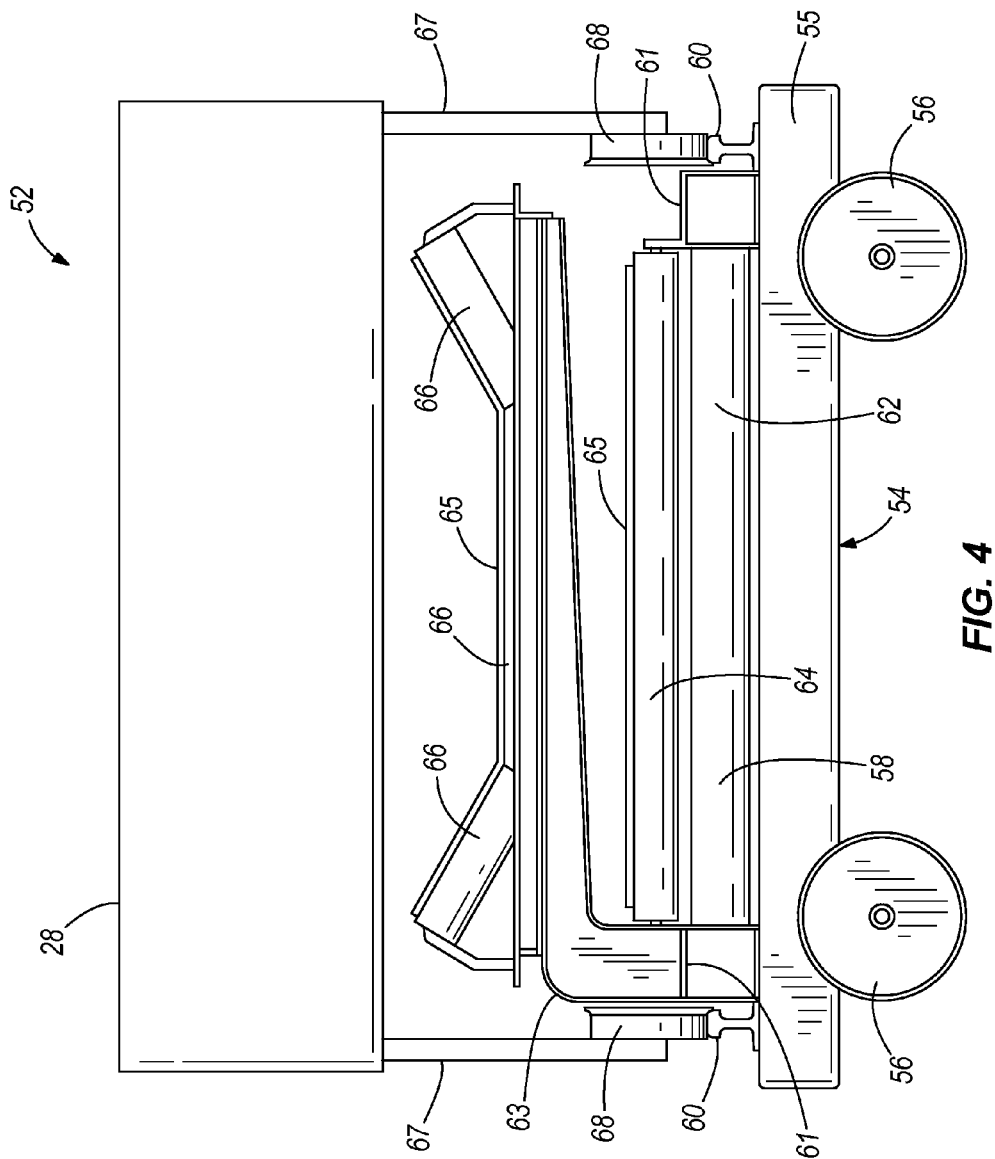
FIG. 4 is a plan view of a section of the face conveyor of FIG. 2.

With reference also to FIG. 4, in the illustrated construction the face conveyors 16 and 18 are made up of a plurality of conveyor sections 52. The conveyor sections are mounted on or may integrally include a conveyor translation device 54 for moving the conveyor sections toward and away from the mining face 14. In the illustrated embodiment, the conveyor translation device 54 includes an undercarriage 55 mounted on wheels 56. The wheels 56 can be rubber-tired wheels, track-type crawlers, or substantially any other type of support that allows for movement of the conveyor sections 52. Although FIG. 4 illustrates the conveyor translation device 54 integral with and positioned beneath the conveyor section 52, other embodiments can include a conveyor translation device 54 that is separate from the conveyor section 52 and/or a conveyor translation device 54 that can push or pull the conveyor section 52 from the side, including, for example, the load translation devices discussed below.

Each conveyor translation device 54 includes a secured configuration in which the conveyor translation device 54 is substantially fixed with respect to the mining face 14 and an unsecured configuration in which the conveyor translation device 54 is moveable with respect to the mining face 14. The secured or unsecured configurations can be accomplished by means of mechanical, hydraulic, pneumatic, or electric systems depending upon the capabilities and configuration of the conveyor translation device 54. For example, in the illustrated embodiment, a braking mechanism that prevents one or more of the wheels 56 from rotating may be suitable. Other embodiments may include more aggressive anchoring systems that drill into or otherwise secure themselves to the ground to prevent movement of the conveyor translation device 54 and the conveyor section 52.

With continuing reference to FIG. 4, the undercarriage 55 supports a conveyor section frame 58 and a hopper support in the form of parallel rails 60. In alternative constructions the rails 60 may be supported by the frame 58. The illustrated frame 58 includes elongated side beams 61 and cross beams 62 (only one cross beam is shown in FIG. 4). The illustrated frame 58 also includes an inverted L-shaped arm 63 that extends upwardly from one of the side beams 61 and then transversely across the width of the conveyor section. A plurality of lower rollers 64 are rotatably supported between the side beams 61 and above the cross beams 62, and support the return run of the conveyor belt 65. A set of troughing rollers 66 is supported by the arm 63 and supports the conveying run of the conveyor belt 65. Some embodiments of the conveyor section 52 may also include a support leg (not shown) on the side of the inverted L-shaped arm 63 that is not connected to the undercarriage 55 to provide further support for the troughing rollers 66 or to support rails 60 mounted above the frame 58 substantially adjacent the troughing rollers 66.

The hopper 28 is supported above the conveyor belt 65 by a hopper frame including supports 67 that extend downwardly from the hopper 28 to wheels 68 that roll along the rails 60. The hopper 28 is moveable along the rails 60 in a direction substantially parallel to the mining face 14, and generally tracks the movement of the continuous miner 10. The hopper 28 may roll freely on the rails 60, being dragged or pushed into position by the continuous miner 10 through the connection provided by the bridge conveyor 26. The hopper 28 may alternatively include an independent drive system for driving the wheels 68, or a drive system may be incorporated into the conveyor sections 52 for moving the hopper 28 along the length of the face conveyor 16.

Referring generally to FIGS. 1-4, in operation, the continuous miner 10 begins removing material from one end of the mining face 14 (e.g., the end adjacent the mid cut) and traverses laterally along the mining face 14. The continuous miner 10 operates by rotating the cutting drums 36 and swinging the boom 32 through its vertical range of motion (e.g. approximately 5 meters) while engaging the cutting drums 36 with the material. As material is removed, the continuous miner 10 advances along the mining face 14. In one exemplary embodiment, the continuous miner 10 removes approximately 30 cubic meters of material for every one meter of lateral advance along the mining face 14.

As the continuous miner 10 advances, material removed by the cutting drums 36 falls or is gathered into the tray 50. The rotating collector wheels 38 guide the material collected in the tray 50 toward the miner conveyor 40. The miner conveyor 40 conveys the material toward the rear of the continuous miner 10 and onto the bridge conveyor 26, which in turn conveys and eventually deposits the material into the hopper 28. Once in the hopper 28, the material may be sized before being deposited onto the face conveyor 16. The face conveyor 16 carries the material toward the discharge portion 24 and deposits it onto the discharge conveyor 12 where it is carried away from the mining site.

As the continuous miner 10 traverses the mining face 14, the hopper 28 moves with the continuous miner 10 from one end of the face conveyor 16 toward the other end of the face conveyor 16. As discussed above, the hopper 28 may be freely moveable along the face conveyor 16 and may be pulled along the face conveyor 16 by the continuous miner 10 and the bridge conveyor 26, or a drive mechanism may be provided on the hopper 28 or on the face conveyor 16 for moving the hopper 28 in a coordinated manner with the continuous miner 10.

When the continuous miner 10 reaches the end of the mining face 14 after an outbound mining pass (e.g., traveling away from the discharge conveyor 12), it may either tram backwardly toward the discharge conveyor 12 or may execute an end cut procedure that allows the continuous miner 10 to turn around and continue to mine while moving inbound toward the discharge conveyor 12. To execute the end cut procedure, the continuous miner 10 turns approximately 90 degrees such that the rotational axis 42 of the cutting drums 36 (see FIG. 3) is substantially parallel with the mining face 14. The continuous miner 10 then advances forwardly into the mining face 14 a distance at least approximately equal to the width of the continuous miner 10, and removes material from the mining face 14 while maintaining engagement between the mining conveyor, bridge conveyor 26, and hopper 28. In some operating situations the depth of the cut may be increased to aid maneuverability of the continuous miner 10 and/or to provide additional space between the mining face 14 and conveyor 16 for subsequent cutouts or turn-around operations.

Upon completion of the initial cut, the continuous miner 10 reverses out of the channel made by the initial cut and repositions the cutting drums 36 for a second cut. The second cut is performed in the same manner as the initial cut but positioned nearer the discharge conveyor. Upon completion of the second cut, there will be a cutout end portion of the mining face 14 having dimensions approximately two miner widths wide and at least about one miner width deep. Depending upon the size and maneuverability of the continuous miner 10, a third cut may also be made to increase the width of the cutout end portion. Once the cutout end portion is completed, the continuous miner 10 is positioned within the cutout end portion with the rotational axis 42 of the cutting drums 36 oriented perpendicular to the mining face 14 and facing toward the discharge conveyor 12. The continuous miner 10 then mines its way back toward the discharge conveyor until it reaches the mid cut, at which point it turns around and performs another mining pass in the outbound direction.

As the continuous miner 10 completes mining passes along the mining face 14, the face conveyor 16 automatically advances toward the mining face 14. The face conveyor 16 may advance toward the mining face 14 as a unit, whereby the entire face conveyor 16 moves toward the mining face 14 simultaneously as the continuous miner 10 repositions itself for the start of the next mining pass, or the face conveyor 16 may "snake" behind the continuous miner 10 as the continuous miner 10 advances along the mining face 14. In either situation, the conveyor translation devices 54 each operate to move their respective conveyor sections 52 toward the mining face 14. For example, with respect to the conveyor section 52 and conveyor translation device 54 of FIG. 4, the conveyor translation device 54 changes from the secured configuration to the unsecured configuration and the wheels 56 are driven to move the conveyor translation device 54 and conveyor section 52 toward the mining face 14. The specific distance moved, and the specific distance between the conveyor section 52 and the mining face 14 upon completion of the repositioning depend upon, among other things, the configuration of the conveyor section 52, the hopper 28, the bridge conveyor 26, and the continuous miner 10.

Figure 5:
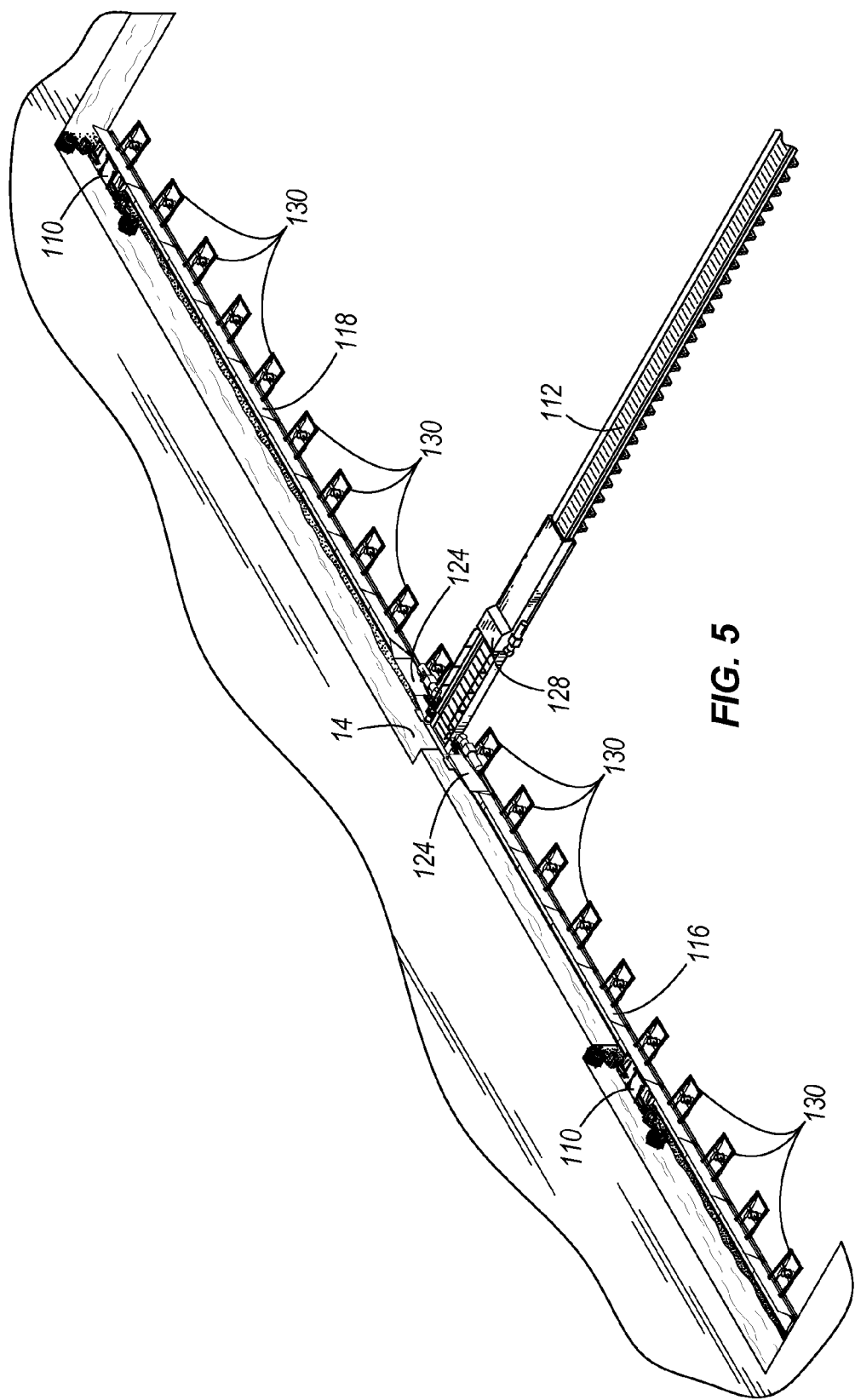
FIG. 5 is an aerial perspective view of another surface mining operation utilizing a surface longwall system.

FIG. 5 is an aerial perspective view of another surface mining operation utilizing a surface longwall system. The surface longwall system includes a discharge conveyor 112 oriented substantially normal to and extending away from the mining face 14. First and second armored face conveyors 116, 118 extend along the mining face 14 and are oriented substantially perpendicular to the discharge conveyor 112. Each of the armored face conveyors 116, 118 has mounted thereon a continuous miner in the form of a surface longwall shearer 110. Each surface longwall shearer 110 is mounted on its respective face conveyor 116, 118 for movement in a lateral direction substantially parallel to the mining face 14. Each armored face conveyor 116, 118 includes a drive end defining a discharge portion 124 positioned adjacent the discharge conveyor 112. The discharge conveyor 112 includes a crusher 128 positioned adjacent the discharge portions 124 of each armored face conveyor 116, 118. A plurality of conveyor translation devices in the form of load translation devices 130 are associated with the armored face conveyors 116, 118 and are operable to move the armored face conveyors 116, 118 toward the mining face 14, as discussed further below.

Figure 6:
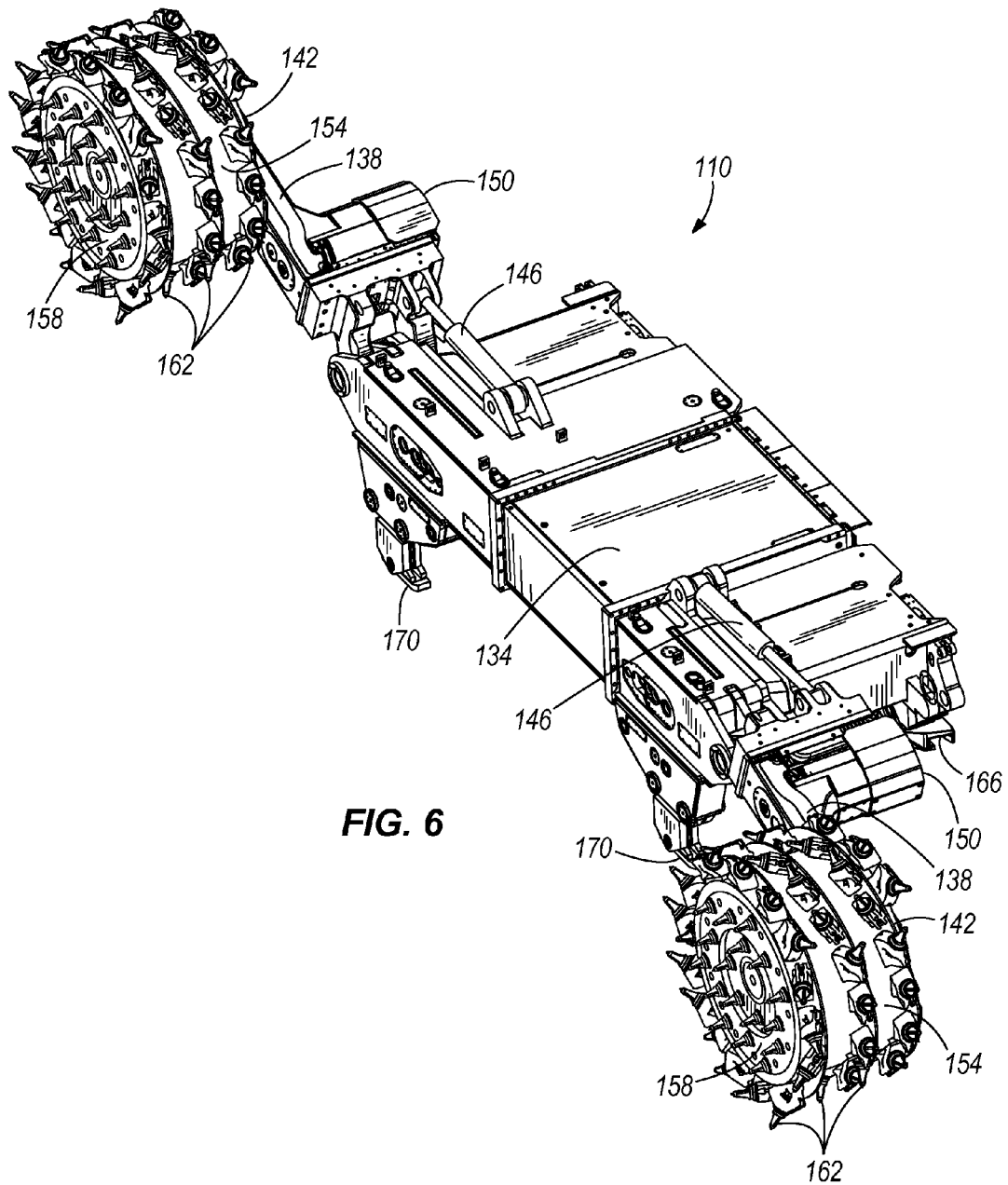
FIG. 6 is a perspective view of a surface longwall shearer associated with the surface longwall system of FIG. 5.

Referring to FIG. 6, each longwall shearer 110 includes a generally rectangular chassis 134 and a pair of articulating arms 138, each of which supports a cutter assembly 142. The arms 138 are pivotally coupled to opposite ends of the chassis 134 and are pivoted by actuators 146 coupled between the arms 138 and the chassis 134. Each arm 138 supports a cutter motor 150 operable to rotatably drive cutter assembly 142. The cutter assembly 142 is generally cylindrical and includes a first, generally cylindrical cutting surface 154 for removing material from the mining face 14 when the longwall shearer 110 moves substantially parallel to the mining face 14, and a second cutting surface 158 defined by an end surface of the cutter assembly 142 for removing material from the mining face 14 when the longwall shearer 110 moves substantially normal to the mining face 14. The second cutting surface 158 may be generally circular, annular, conical, or frusto-conical depending, among other things, on the type of material the cutting surface 158 is intended to cut. Both the first and second cutting surfaces 154, 158 can be provided with a plurality of cutting teeth 162 of varying configurations for removing material from the mining face 14. In the illustrated construction, the teeth 162 are mounted on the cutting surfaces 154 and 158.

The longwall shearer 110 also includes a pair of inboard support feet 166 and a pair of outboard support feet 170 (only one of the outboard support feet being visible in FIG. 6). The inboard and outboard support feet 166, 170 are configured for mounting to the face conveyors 116, 118 such that the longwall shearer 110 can move laterally along the face conveyors 116, 118 from the discharge portion 124 to the distal ends of the face conveyors 116, 118 and back again. In some embodiments, the longwall shearer 110 utilizes water cooled motors and includes a closed circuit variable water flow system (not shown). The water flow system can include a suitable combination of pumps, thermostats, radiators, and/or heat exchangers for controlling the flow of cooling water through the longwall shearer 110.

Figure 7:
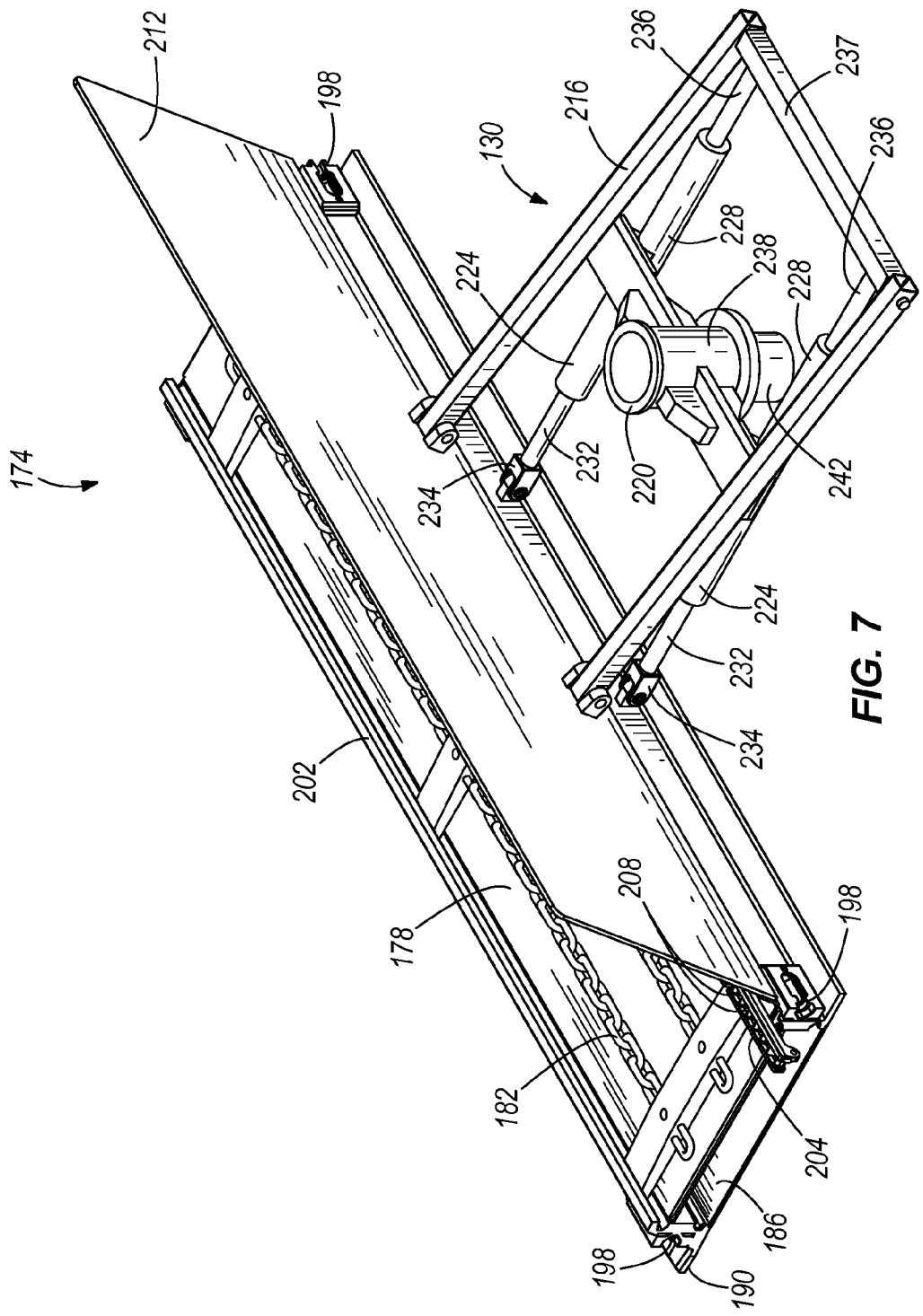
FIG. 7 is a perspective view showing a portion of an armored face conveyor associated with the surface longwall system of FIG. 5 and a load translation device for moving the face conveyor.
Figure 8:
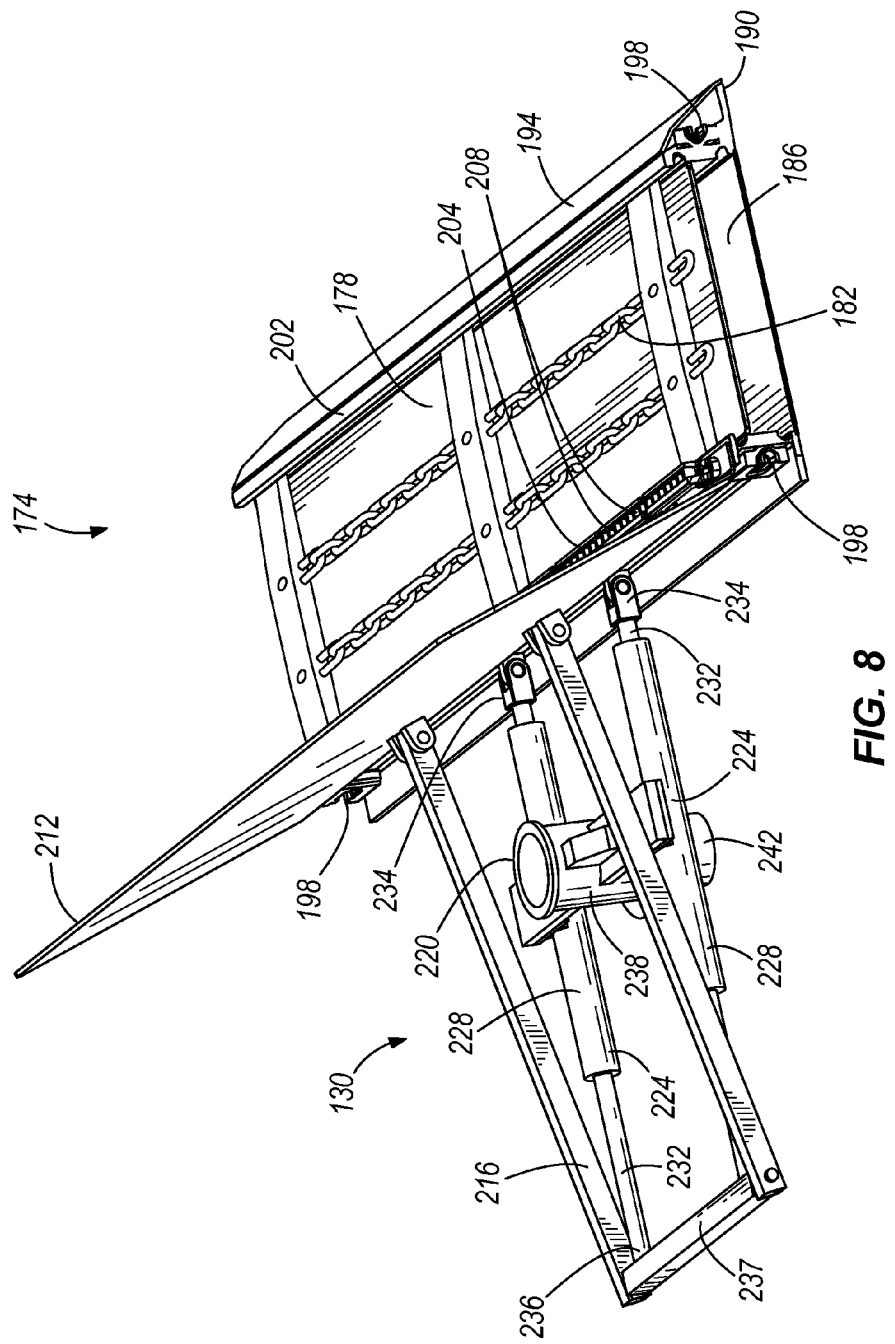
FIG. 8 is another perspective view of the portion of the armored face conveyor of FIG. 7.

With reference to FIGS. 7 and 8, each face conveyor 116, 118 is comprised of a plurality of conveyor sections 174. Each conveyor section 174 includes a tray portion 178 for supporting the advancing run of a chain conveyor 182, and a channel portion 186 below the tray portion 178 through which the return run of the chain conveyor 182 extends. The chain conveyor 182 is driven by a drive assembly associated with the discharge portion 124. A toe portion 190 of the conveyor section 174 is positioned proximal to the mining face 14 during operation, and includes an angled surface 194 that guides material cut from the mining face 14 upwardly and onto the chain conveyor 182 when the conveyor section 174 advances toward the mining face 14.

The corners of the conveyor section 174 are each provided with an attachment receptacle 198 that facilitates attachment of the conveyor section 174 to an adjacent conveyor section 174. An inboard edge (nearest the mining face 14 during operation) of the tray portion 178 defines a guide rail 202 upon which the inboard support feet 170 of the longwall shearer 110 ride. An outboard edge of the tray portion 178 defines a drive rail 204 upon which the outboard support feet 166 of the longwall shearer 110 ride. The drive rail 204 includes a plurality of drive teeth 208 that are engaged by corresponding teeth (not shown) formed on the outboard support feet 166 such that the longwall shearer 110 can be driven along the face conveyor 116, 118. In some embodiments, the longwall shearer 110 includes an on-board drive assembly for driving the longwall shearer 110 along the face conveyor 116, 118. In other embodiments, drive assembly may be provided on one or more of the conveyor sections 174 or may be associated with the discharge portion 124 for moving the longwall shearer 110 along the face conveyor 116, 118. A spill plate 212 extends at an angle away from the tray portion 178 just outboard of the drive rail 204. The spill plate 212 extends upwardly and away from the mining face 14 such that material falling from the mining face 14 is guided onto the conveyor 182 and does not fall behind the conveyor section 174.

With continued reference to FIGS. 7 and 8, the illustrated load translation device 130 includes a frame 216, a drill assembly 220, and a pair of actuators 224 (some embodiments may include a single actuator 224). Each actuator 224 includes a first actuator portion 228 coupled to the drill assembly 220, and a second actuator portion 232 moveable relative to the first actuator portion 228 and coupled to the frame 216 and to the conveyor section 174. The actuators 224 are operable to move the frame 216 and the conveyor section 174 relative to the drill assembly 220 for advancing the conveyor section 174 toward the mining face 14. In some embodiments, one or more of the actuators 224 are linear actuators and include a linear transducer.

In the illustrated construction, the actuators 224 are generally cylindrical and the second actuator portion 232 extends through the first actuator portion 228. An inboard end 234 of the second actuator portion 232 is coupled to the conveyor section 174 and an outboard end 236 of the second actuator portion 232 is coupled to the frame 216. The frame 216 extends upwardly and at an angle from the outboard end 236 of the second actuator portion 232 and is coupled to the spill plate 212 of conveyor section 174. The frame 216 also includes a cross brace 237 that extends between the second actuator portions 232. The frame 216, conveyor section 174, and second actuator portion 232 thus define a substantially rigid, triangulated structure, and are substantially fixed for movement together.

The drill assembly 220 includes a generally cylindrical housing portion 238 that supports and guides a drill member 242 that can be drilled into and extracted from the ground to substantially fix the location of the drill assembly 220 relative to the mining face 14. When the drill member 242 is drilled into the ground, the load translation device 130 is in a secured configuration, and when the drill member 242 is extracted from the ground, the load translation device 130 is in an unsecured configuration. In some embodiments, the drill member 242 is substantially annular to minimize the drilling cross sectional area for maximum load reaction capability. This annular configuration minimizes the time for the drill member 242 to be drilled into the ground and minimizes wear on the drill member 242. Another benefit of the annular drill member 242 is that as the conveyor section 174 advances, the drill member 242 leaves an annular ring cut in the ground as opposed to an open hole that could present a hazard to people or machinery maneuvering over the recently uncovered surface of the mining area. A drive system associated with the housing portion 238 is operable to rotate the drill member 242 about a drill axis and to also translate the drill member 242 along the drill axis during drilling operations. Although not illustrated, in some embodiments the load translation device 130 also includes an integrated hydraulic energy distribution system, such as an electric motor or internal combustion engine driving a hydraulic pump, and associated valves and control devices, such that, other than control signals for coordinating operation with other components of the surface mining system, each load translation device 130 is an independently functioning unit.

Figure 9:
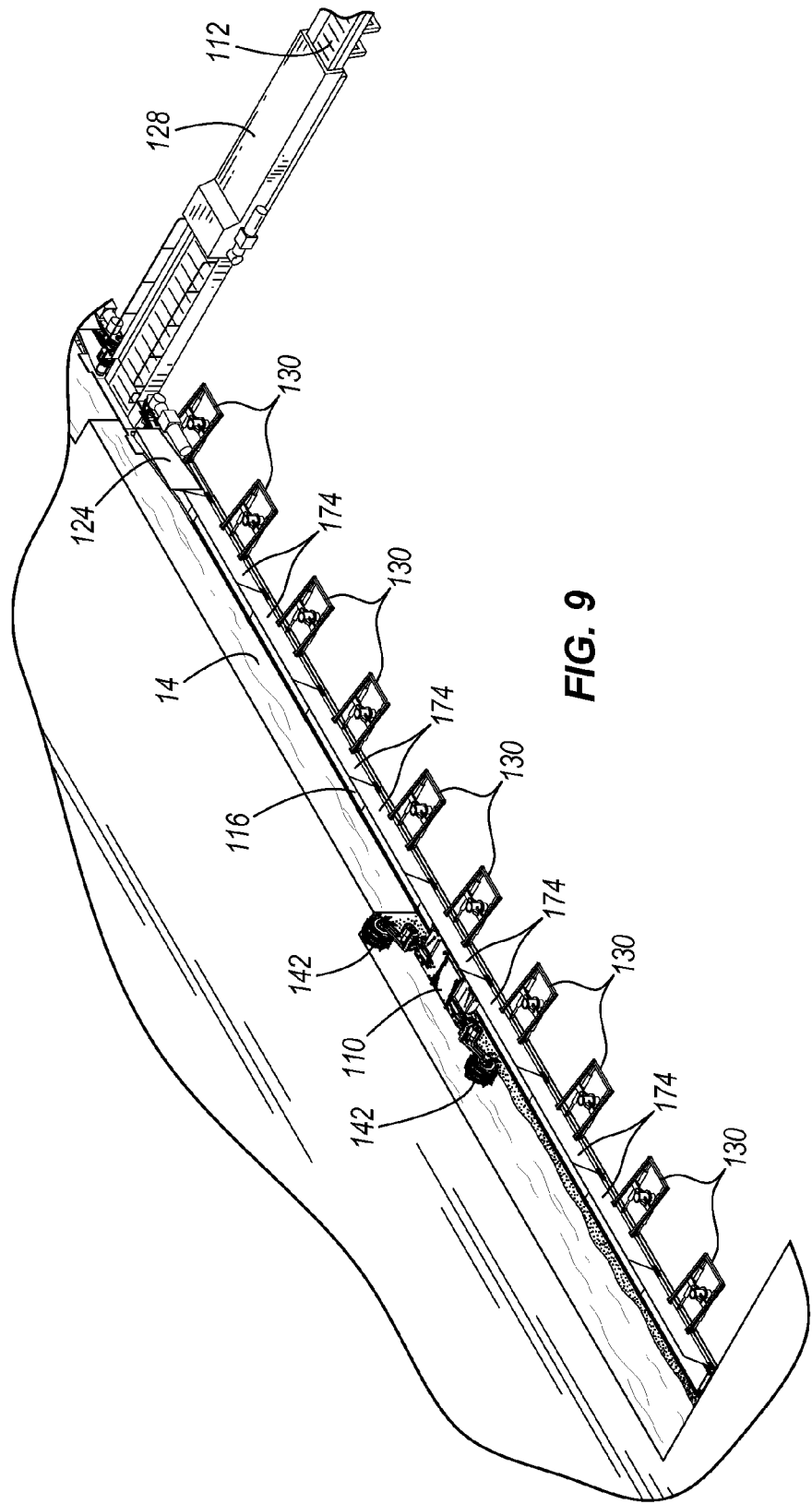
FIG. 9 is an enlarged perspective view similar to FIG. 5 showing the surface longwall shearer of FIG. 6 removing material from the mining face, the armored face conveyor of FIGS. 7 and 8 conveying material toward a crusher, and a plurality of the load translation devices of FIGS. 7 and 8.
Figure 10:
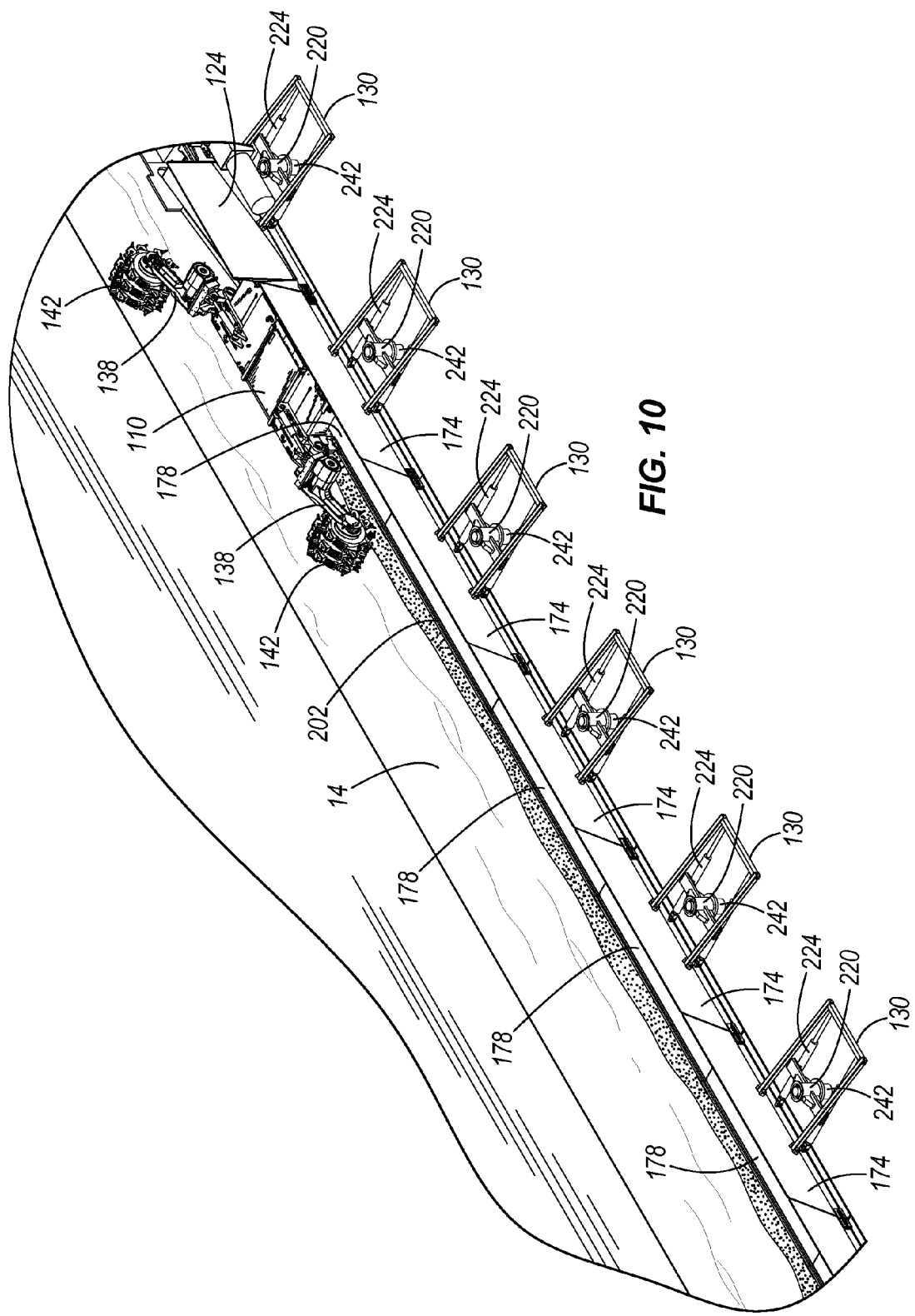
FIG. 10 is perspective view of a portion of the surface longwall system of FIG. 5 before a blind sumping operation.

With reference also to FIGS. 9 and 10, several conveyor sections 174 are coupled to one another and extend along the mining face 14. A load translation device 130 is associated with each conveyor section 174 and each load translation device 130 is operable to move its respective conveyor section 174 toward the mining face 14. The longwall shearer 110 rides on the guide rails 202 and drive rails 204 (see FIGS. 7-8) of the conveyor sections 174 and laterally traverses the mining face 14 to remove material from the mining face 14. During lateral movement of the longwall shearer 110, the cutter assemblies 142 are rotated by the cutter motors 150 and the articulating arms 138 are pivoted upwardly and downwardly by the actuators 146 such that the cylindrical cutting surfaces 154 engage and remove material from the mining face 14 (see FIGS. 7-8).

When the longwall shearer 110 is laterally traversing the mining face 14, the load translation devices 130 are in a secured configuration such that the load translation devices 130 substantially fix the position of the conveyor sections 174 relative to the mining face 14. More specifically, the drill member 242 is extended into and engaged with the ground such that the drill member 242 functions to react forces associated with the cutting and conveying operations of the longwall shearer 110 and conveyor sections 174 to maintain the overall stability of the system. Moreover, the actuators 224 operate to maintain a substantially fixed relationship between the drill assembly 220 and the conveyor section 174.

Figure 11:
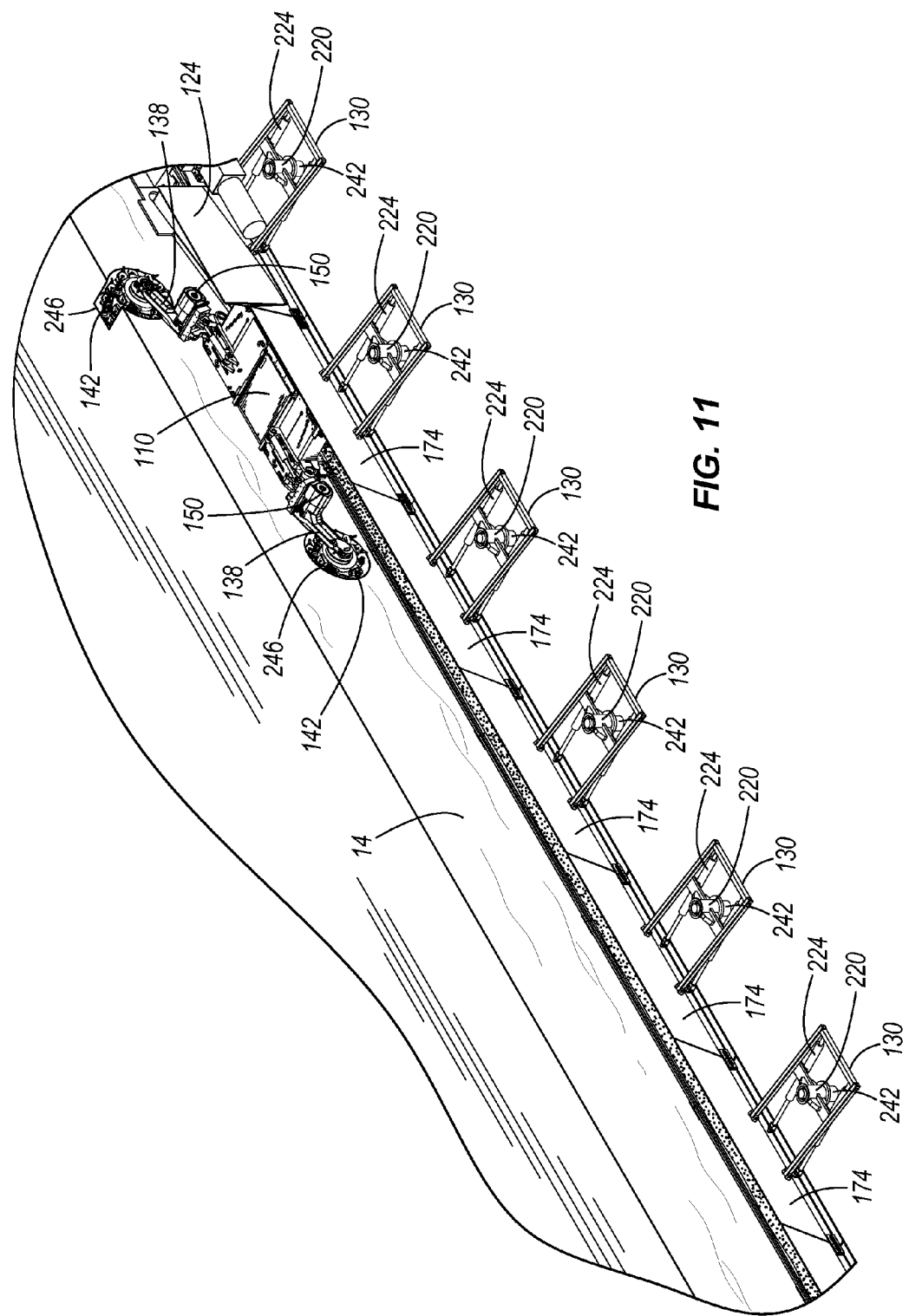
FIG. 11 is a perspective view similar to FIG. 10 showing the surface longwall system immediately following a blind sumping operation.
Figure 12:
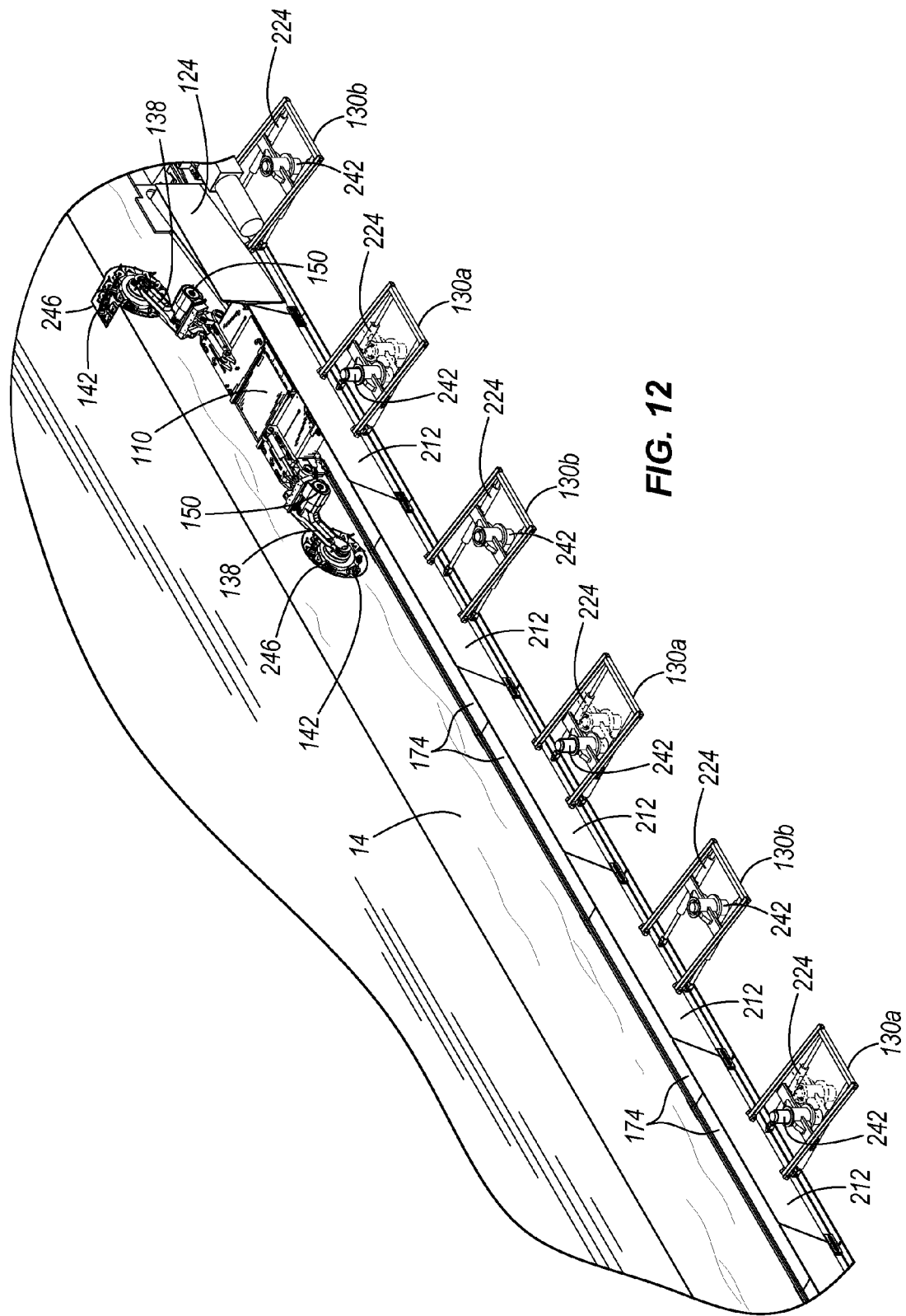
FIG. 12 is a perspective view similar to FIG. 10 showing the surface longwall system after a first set of load translation devices have reset following a blind sumping operation.

Referring now to FIGS. 10-12, the load translation devices 130 are operable to perform a blind sumping operation that allows the longwall shearer 110 to operate bidirectionally. FIGS. 10-12 illustrate the surface longwall system in various configurations associated with a blind sumping operation and performed with the longwall shearer 110 positioned near the discharge portion 124 of the first armored face conveyor 116. The same operation also can be performed when the longwall shearer 110 is positioned at the far distal end of the armored face conveyor 116 at the end of the mining face 14 (see FIG. 9).

As shown in FIG. 10, the load translation devices 130 are configured with their respective drill members 242 extended and engaged with the ground. Also, the actuators 224 of each load translation device 130 are in a retracted position whereby the drill assembly 220 is positioned as close to the conveyor section 174 as the configuration of the actuators 224 and the frame 216 will allow. The longwall shearer 110 has reached an end position on the armored face conveyor 116 and has just completed a pass along the mining face 14. During the blind sumping operation, the longwall shearer 110 remains substantially fixed relative to the conveyor sections 174, and the articulating arms 138 remain substantially fixed relative to the chassis 134 of the longwall shearer 110.

To initiate the blind sumping operation, the cutter assemblies 142 are rotated and the actuators 224 of the load translation devices 130 are activated to push the frame 216, the conveyor sections 174, and the longwall shearer 110 toward the mining face 14 in a direction substantially perpendicular to the mining face 14. As the longwall shearer 110 moves toward the mining face 14, the second cutting surfaces 158 of the cutter assemblies 142 engage the mining face 14 and drill or sump into the mining face 14. As shown in FIG. 11, when the actuators 224 reach their fully extended position, the cutter assemblies 142 have each drilled or sumped a generally cylindrical hole 246 in the mining face 14. The range of extension of the actuators 224 and the corresponding depth of the holes 246 are chosen to substantially correspond to the width of the cutter assemblies 142. In addition to forming the holes 246, extension of the actuators 224 and movement of the conveyor sections 174 toward the mining face 14 pushes material that has fallen between the conveyor sections 174 and the mining face 14 upwardly and over the toe portion 190 and angled surface 194 of the conveyor sections 174 (see FIG. 8) and onto the tray portion 178 of the conveyor section 174 such that the conveyor 182 can convey the material toward the discharge portion 124.

In some operating environments, the longwall shearer 110 may use an alternative sumping method that does not involve the second cutting surfaces 158 of the cutter assemblies 142. To initiate the alternative sumping method, the articulating arms 138 are raised such that the cutter assemblies 142 are positioned above a top surface of the mining face 14. With the cutter assemblies 142 above the mining face 14, the actuators 224 of the load translation devices 130 are activated to push the frame 216, the conveyor sections 174, and the longwall shearer 110 toward the mining face. As the actuators 224 extend, the material that has fallen between the conveyor sections 174 and the mining face 14 is pushed upwardly and over the toe portion 190 and angled surface 194 of the conveyor sections 174 (see FIG. 8) and onto the tray portion 178 of the conveyor section 174. Once the actuators 224 are fully extended, the cutter assemblies 142 are positioned above the mining face 14. The cutter motor 150 is then operated to rotate the cutter assembly 142 and the articulating arms 138 are moved downwardly to engage the cylindrical cutting surface 154 with the top surface of the mining face 14. The articulating arms 138 continue to move downwardly such that the cylindrical cutting surface 154 cuts an arcuate slot into the mining face 14 until the cutter assemblies 142 are positioned adjacent the ground. The longwall shearer 110 can then begin another pass along the mining face 14.

Regardless of which sumping method used, once the actuators 224 are extended and the holes 246 associated with the blind sumping method or the arcuate slots associated with the alternative sumping method have been formed, the load translation devices 130 begin a resetting operation such that when the longwall shearer 110 completes the next pass down the mining face 14 and arrives at the opposite end of the armored face conveyor 116, all of the load translation devices 130 are once again configured to perform another sumping operation. As shown in FIG. 12, the resetting operation involves a first group of load translation devices 130a retracting their drill members 242 to remove them from the ground, and then operating their actuators 224 to move the drill assembly 220 toward the corresponding conveyor section 174. While the first group of load translation devices 130a are resetting, the conveyor section 174 remains fixed relative to the mining face 14 in part due to their substantial mass and further because a second group of conveyor translation devices 130b keep their drill members 242 in the extended position and remain secured to the ground. The actuators 224 of the second group of load translation devices 130b remain in the extended position while the first group of load translation devices 130a reset. Once the first group of load translation devices 130a are reconfigured such that the drill assembly 220 is once again as close to the conveyor section 174 as the configuration of the actuators 224 and the frame 216 will allow, the first group of load translation devices 130a activate their drill assemblies 220 and drill the drill members 242 back into the ground in the new position. Once the drill members 242 of the first group of load translation devices 130a are extended and secured within the ground, the second group of load translation devices 130b retracts the drill members 242 and activates the actuators 224 to move the drill assembles 220 back toward the conveyor sections 174. Once reset, the second group of load translation devices 130b also activates the drill assemblies 220 to drill the drill members 242 back into the ground in the new position, and the surface longwall system is thereafter ready to perform another blind sumping operation. In some applications, the longwall shearer 110 may begin traversing the mining face 14 while the load translation devices 130 reset. In other applications, the longwall shearer 110 may wait for the load translation devices 130 to reset before beginning the next pass along the mining face 14. Although the foregoing description relates to a surface longwall system in which the entire armored face conveyor 116 executes a straight line advance toward the mining face 14, other applications may utilize a snaking advance pattern similar to that discussed above with respect to the face conveyor 16.

Some operating environments may allow for a somewhat simplified resetting procedure. Rather than activating all of the load translation devices 130 at the same time to move the conveyor sections 174 toward the mining face 14, it may be possible to move the conveyor sections 174 toward the mining face 14 using only some of the load translation devices 130. For example, before initiating one of the sumping methods discussed above, the second group 130b of load translation devices may retract their drill members 242 and configure their actuators 224 to substantially fix the relative position of each load translation device 130b relative to the conveyor sections 174. The first group 130a of load translation devices may then operate their actuators 224 as discussed above to move the conveyor sections 174 and the load translation devices 130b toward the mining face 14. Once the first group 130a of load translation devices has finished moving the conveyor sections and load translation devices 130b toward the mining face 14, the load translation devices 130b can begin to extend their drill members 242 into the ground to anchor the conveyor sections 174 in the new location. Simultaneously or shortly thereafter, the load translation devices 130a can extract their drill members 242 from the ground and activate their actuators 224 to move their drill assembles 220 back toward the conveyor sections 174. To reduce wear and improve operating time, the groups of load translation devices 130a and 130b may alternate operating as the "pushing" load translation devices.

The drill assembly 220, in addition to operating to move the drill member 242 between extended and retracted positions, also is operable to apply a controlled vertically downward force on the toe portion 190 of the conveyor section 174. For example, without rotating the drill member 242, the drill assembly 220 can operate the same drive mechanism that would normally be used to move the drill in the axial direction, but for the purpose of applying or removing a tipping load on the toe portion 190. This pan tip load is an important component of effective horizon control and clean up (e.g., when the conveyor sections 174 are advanced forwardly to push remove material upwardly onto the channel portion 186). The ability to control pan tip load via a vertical force applied by the drill assembly 220 of the load translation device 130 provides a capability to adjust for conditions and to assure a stable operating platform for shearing and conveying operations.

To increase production rates in high seam applications, the longwall shearers 110 may be operated in a manner to promote the caving of overhanging material onto the armored face conveyors 116, 118. For example for an 8-meter high seam of material, the longwall shearers 110 may cut away only the bottom 4 meters of material, thereby forming an undercut that leaves 4 meters of overhanging material. By controlling the inclination of the longwall shearers 110 and the angles at which the cutting cutter assemblies 142 engage the mining face 14, caving of the overhanging material can be promoted. When the overhanging material caves onto the armored face conveyors 116, 118, the angled spill plates 212 guide the caved material onto the tray portions 178 of the conveyor sections 174. Depending upon the application, lump breakers (not shown) may be mounted to the longwall shearer 110 to break up large pieces of caved material so the material can pass below the chassis 134 of the longwall shearer 110 when being conveyed toward the discharge portion 124 and the crusher 128.

To accommodate the advancement of the armored face conveyors 116, 118, the crusher 128 includes or is associated with a drive mechanism for moving the crusher 128 toward the mining face 14 along with the armored face conveyors 116, 118. Moreover, the discharge conveyor 112 is provided with an automatic belt extension system that extends the discharge conveyor 112 as the crusher 128 and the armored face conveyors 116, 118 advance. Suitable automatic belt extension systems may include one or more belt storage units, such as those that run the conveyor belt through several turns along a variable serpentine path, or other systems that are able to install or otherwise add sections to the discharge conveyor 112 while the discharge conveyor 112 is operating. To minimize cable handling issues, the belt extension system can include an integrated electrical communication service cable handling system with reeling capacity matched to the belt extension length.

Both the system of FIGS. 1-4 using the surface continuous miner 10 and the system of FIGS. 5-12 using the surface longwall shearer 110 can be controlled by an automated central control system that is remote from the actual mining components. Components may be controlled using wired or wireless signals that relay component status, configuration, and location to the central control system. For example, the continuous miner 10 may include various sensors, transducers, cameras, and the like that provide information such as the angle of the cutting arm 32, cutting drum 36 rotational speed, forward speed of the continuous miner 10 itself, torque loads on various drive mechanisms, and the like. Additional sensors may be provided on the face conveyors 16, 18, the discharge conveyor 12, the bridge conveyor 26, and the hopper 28 for monitoring the material that is conveyed along the system. In this regard, the central control system may be operable to control, among other things, conveyor speeds, hopper position, conveyor position, and the like. For example, the controller may be operable to control all aspects of the "snaking" advancement of the face conveyors 16, 18 discussed above by monitoring the direction and relative location of the hopper 28 with respect to the various conveyor sections 54. Once the hopper 28 has advanced sufficiently past a conveyor section 52, the central control system may automatically operate the associated conveyor translation device 54 to move the conveyor section 52 toward the mining face 14. The central control system may also automatically control movement of the continuous miner 10 during the end cut procedure discussed above.

A similar system can also be implemented with respect to the surface longwall system of FIG. 5. The longwall shearer 110 can include sensors for determining, among other things, the position of the articulating arms 138, and the speed and torque of the cutter motors 150, all of which can also be controlled by the central control system. Similarly, the load translation device 130 can include sensors for determining positions and loading of the drill member 242 and actuators 224, and sensors relating to the torque of their associated drive units. Because the central control system is also operable to control operation of the various motors, drives, and actuators, the system can operate in a closed loop that requires minimal operator supervision. In some embodiments, one or more of the actuators 224 include a linear transducer in communication with the controller to provide closed loop control over the position of an associated conveyor section. One area where closed loop control can be particularly advantageous is during the blind sumping operation discussed above. During blind sumping, the central control system can monitor the motor torque of the cutter motors 150 as the cutter assemblies 142 are engaged with the mining face 14 by the driving force provided by extension of the linear actuators 224 of the load translation devices 130. If motor torque increased beyond a predetermined threshold value, the central control system can slow or stop extension of the linear actuators 224 until the motor torque values fall below the threshold value. The central control system can then further extend the actuators 224 while continuing to monitor the motor torque of the cutter motors 150.

To assist in the remote, automated operation of the systems of FIGS. 1-4 and FIGS. 5-12, some or all of the components can be provided with global positioning system ("GPS") or local positioning system ("LPS") receivers and/or transmitters. GPS and/or LPS systems allow positional information for the various components to be fed back to the central control system in real time. For the system of FIGS. 1-4, some of the components that may include one or more GPS and/or LPS receivers and/or transmitters include the continuous miner 10, the discharge conveyor 12, the face conveyors 16, 18 (including some or all of the conveyor sections 52), and the hoppers 28. Because it is configured to adjust its orientation relative to the mining face 14, the continuous miner 10 in particular may include multiple GPS and/or LPS receivers and/or transmitters so the specific orientation of the continuous miner 10 relative to the mining face 14 can be determined. For example, a first GPS/LPS receiver/transmitter may be positioned on or adjacent to the mining head 34, and a second GPS/LPS receiver/transmitter may be postioned near the rear of the continuous miner adjacent the bridge conveyor 26. For the system of FIGS. 5-12, some of the components that may include one or more GPS and/or LPS receivers and/or transmitters include the longwall shearer 110, discharge portion 124, crusher 128, load translation devices 130, and armored face conveyors 116, 118 (including some or all of the conveyor sections 174). GPS and/or LPS systems allow the central control system to monitor and control the cutting horizon (vertical plane) of the mining face 14 and the location and relative position of key system components. The inherent nature of the GPS system presents some limitations for monitoring position in the vertical plane. For this reason, the GPS system may be supplemented by a dedicated LPS system that includes one or more transmitters and/or receivers having fixed and known positions in the vicinity of the surface mining operation. The supplemental LPS system can be used independently or in conjunction with the GPS system to provide a more accurate determination of various components position, particularly in the vertical plane.

What is claimed is:

1. A side shifting conveyor for a surface mining operation, the conveyor comprising:
    a plurality of conveyor sections extending generally in a conveying direction;
    a plurality of conveyor translation devices, each conveyor translation device associated with at least one of the plurality of conveyor sections, each conveyor translation device including a drive operable to move the associated at least one conveyor section in a direction substantially perpendicular to the conveying direction and each conveyor translation device including a securing device operable to fix the conveyor translation device with respect to a mining surface of the surface mining operation; and
    a controller operatively coupled to each drive and securing device for controlling operation of the drive and securing device and coordinating movement of the plurality of conveyor sections.

2. The conveyor of claim 1, further comprising a hopper positioned above the plurality of conveyor sections and moveable along the plurality of conveyor sections.

3. The conveyor of claim 2, wherein the controller is operable to sense a position of the hopper along the plurality of conveyor sections.

4. The conveyor of claim 3, wherein the controller sequentially operates the conveyor translation devices as the hopper moves past the associated conveyor sections.

5. The conveyor of claim 1, wherein the securing device includes a drill member securable within the mining surface and wherein the drive includes a linear actuator coupled between the drill member and the associated at least one conveyor section.

6. The conveyor of claim 5, wherein the linear actuator includes a linear transducer in communication with the controller to provide closed loop control over the position of the associated at least one conveyor section.

7. The conveyor of claim 5, wherein the drill member is controlled by the controller.

8. The conveyor of claim 1, wherein the controller sequentially operates each drive to move the plurality of conveyor sections in a snaking pattern.

9. The conveyor of claim 1, wherein the controller operates each drive substantially simultaneously such that the entire conveyor moves together as a unit in the direction generally perpendicular to the conveying direction.

10. A method for moving a conveyor in a surface mine, the conveyor including a plurality of conveyor sections extending in a conveying direction, the method comprising:
    sensing that a surface miner operable to deposit material onto the conveyor sections has moved beyond one of the plurality of conveyor sections;
    fixing a position relative to the surface mine of a conveyor translation device with a securing device, the conveyor translation device associated with the one of the plurality of conveyor sections; and
    operating a drive of the conveyor translation device to move the one of the plurality of conveyor sections in a direction substantially perpendicular to the conveying direction.

11. The method of claim 10, wherein sensing that the surface miner has moved beyond one of the plurality of conveyor sections includes sensing that a hopper coupled to the surface miner and moveable along the conveyor sections has passed over the one of the plurality of conveyor sections.

12. The method of claim 10, wherein fixing the position relative to the surface mine of the conveyor translation device with the securing device associated with the one of the plurality of conveyor sections includes drilling into the surface mine.

13. The method of claim 10, wherein operating the drive of the conveyor translation device includes activating a linear actuator coupled between the conveyor translation device and the associated one of the plurality of conveyor sections.

14. The method of claim 10, further comprising, after operating the drive of the conveyor translation device to move the one of the plurality of conveyor sections, unfixing the position relative to the surface mine of the conveyor translation device, fixing a position relative to the surface mine of the one of the plurality of conveyor sections, and operating the drive of the conveyor translation device to move at least a portion of the conveyor translation device toward the one of the plurality of conveyor sections to thereby reset the conveyor translation device for a subsequent moving operation.

15. The method of claim 14, wherein fixing the position of the one of the plurality of conveyor sections includes fixing the position of a pair of additional conveyor sections positioned on either side of the one of the plurality of conveyor sections.

16. A side shifting conveyor for a surface mining operation, the conveyor comprising:
- a plurality of conveyor sections extending generally in a conveying direction;
- a plurality of conveyor translation devices, each conveyor translation device associated with at least one of the plurality of conveyor sections, each conveyor translation device including a drive operable to move the associated at least one conveyor section in a direction substantially perpendicular to the conveying direction and each conveyor translation device including a securing device operable to fix the conveyor translation device with respect to a mining surface of the surface mining operation; and
- a controller operatively coupled to each drive and securing device for controlling operation of the drive and securing device and coordinating movement of the plurality of conveyor sections, wherein the conveyor translation device is fixed with respect to the mining surface when the drive operates to move the associated at least one conveyor section.

17. The conveyor of claim 16, further comprising a hopper positioned above the plurality of conveyor sections and moveable along the plurality of conveyor sections.

18. The conveyor of claim 17, wherein the controller is operable to sense a position of the hopper along the plurality of conveyor sections.

19. The conveyor of claim 18, wherein the controller sequentially operates the conveyor translation devices as the hopper moves past the associated conveyor sections.

20. The conveyor of claim 16, wherein the securing device includes a drill member securable within the mining surface and wherein the drive includes a linear actuator coupled between the drill member and the associated at least one conveyor section 21. The conveyor of claim 20, wherein the linear actuator includes a linear transducer in communication with the controller to provide closed loop control over the position of the associated at least one conveyor section.

22. The conveyor of claim 16, wherein the controller sequentially operates each drive to move the plurality of conveyor sections in a snaking pattern.

23. The conveyor of claim 16, wherein the controller operates each drive substantially simultaneously such that the entire conveyor moves together as a unit in the direction generally perpendicular to the conveying direction.

24. A side shifting conveyor for a surface mining operation, the conveyor comprising:
- a plurality of conveyor sections extending generally in a conveying direction;
- a plurality of conveyor translation devices, each conveyor translation device associated with at least one of the plurality of conveyor sections, each conveyor translation device including a drive operable to move the associated at least one conveyor section in a direction substantially perpendicular to the conveying direction and each conveyor translation device including a securing device operable to fix the conveyor translation device with respect to a mining surface of the surface mining operation; and
- a controller operatively coupled to each drive and securing device for controlling operation of the drive and securing device and coordinating movement of the plurality of conveyor sections, wherein the controller operates each drive substantially simultaneously such that the entire conveyor moves together as a unit in the direction generally perpendicular to the conveying direction.

* * * * *